Figure 1:
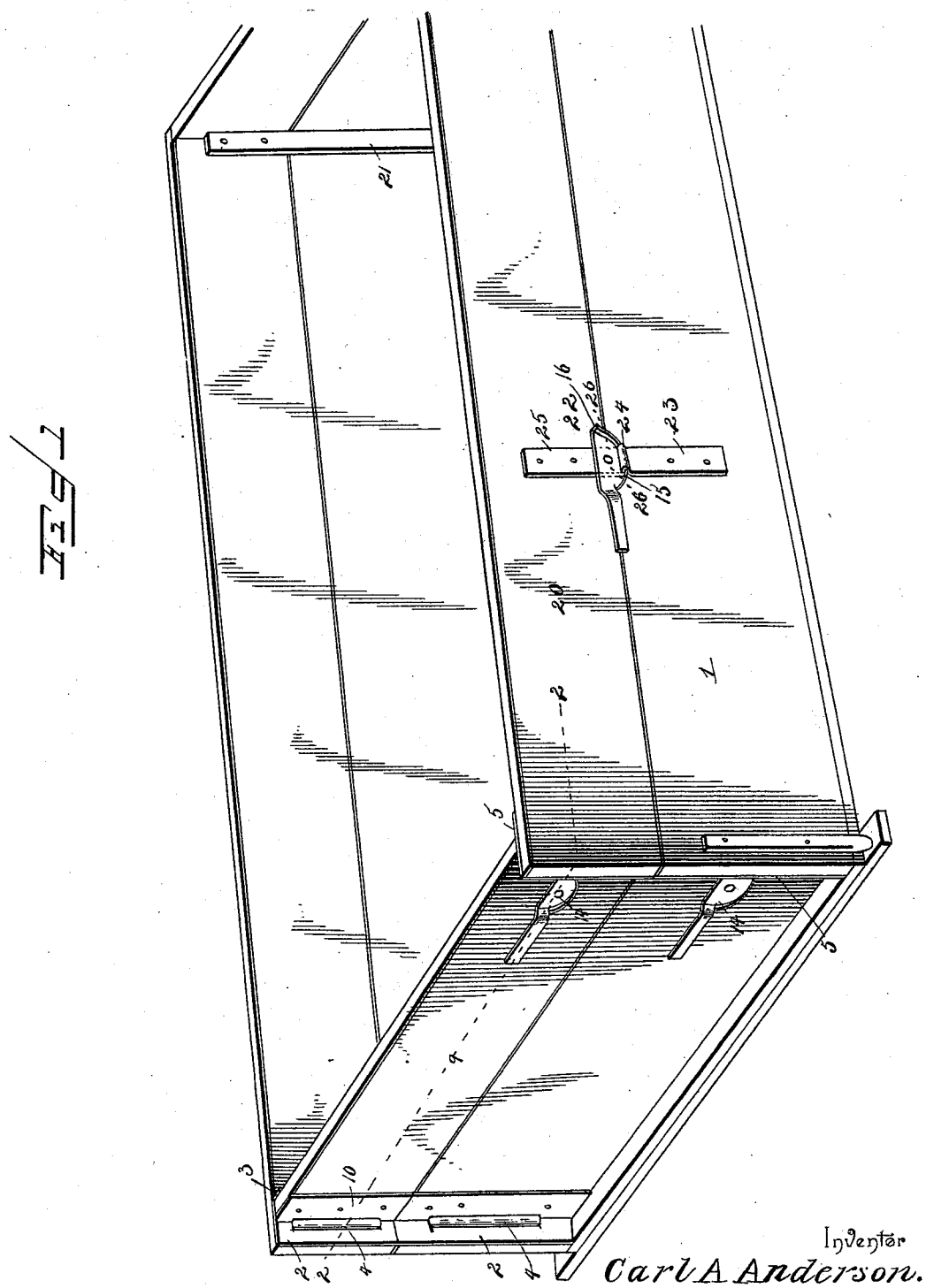

(No Model.) 2 Sheets—Sheet 1.

C. A. ANDERSON.
FASTENING DEVICE FOR END GATES.

No. 517,912. Patented Apr. 10, 1894.

Witnesses
W. Schneider

Inventor
Carl A. Anderson.
By his Attorneys.
C. A. Snow & Co.

THE NATIONAL LITHOGRAPHING COMPANY,
WASHINGTON, D. C.

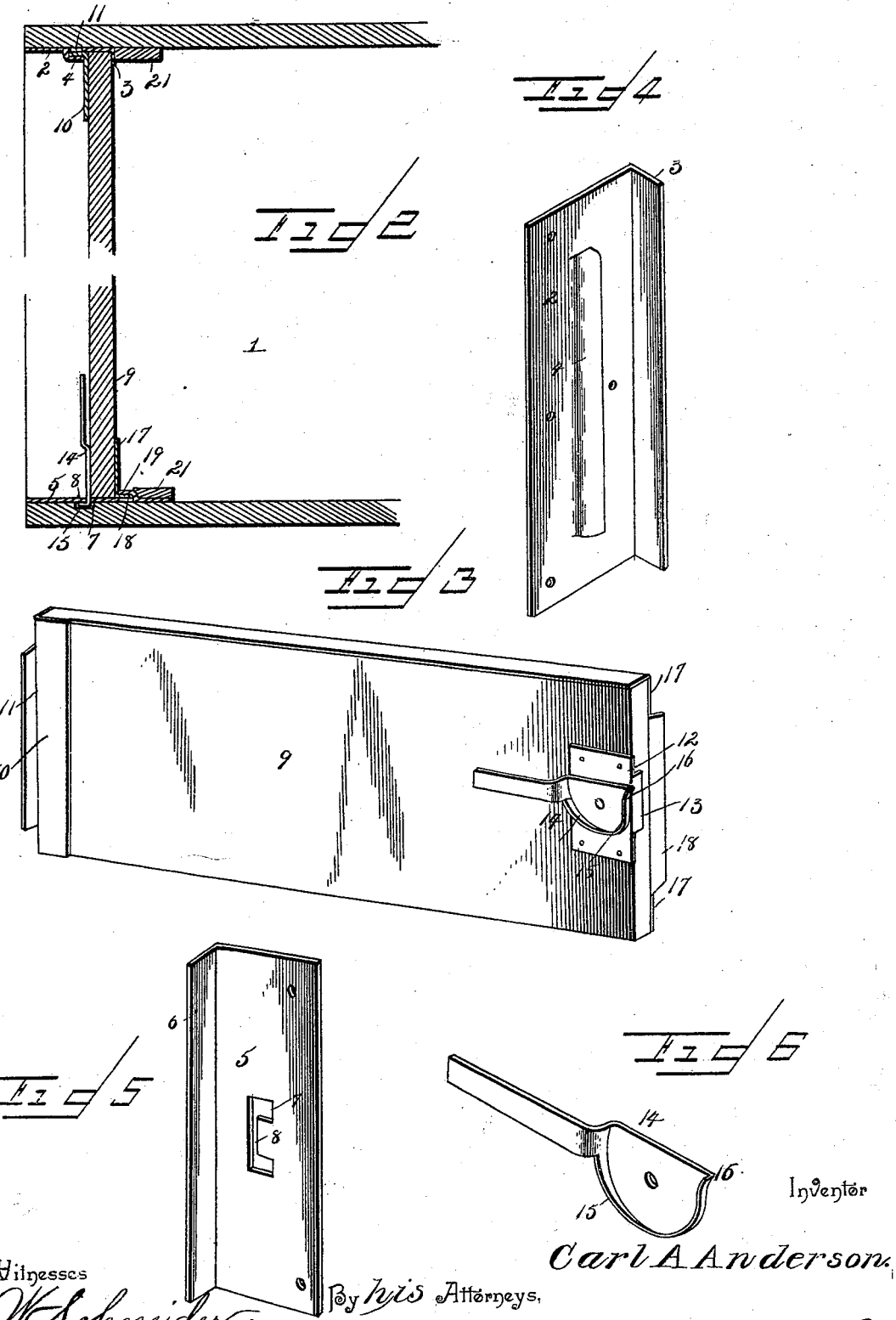

UNITED STATES PATENT OFFICE.

CARL A. ANDERSON, OF LYNN CENTER, ILLINOIS.

FASTENING DEVICE FOR END-GATES.

SPECIFICATION forming part of Letters Patent No. 517,912, dated April 10, 1894.

Application filed November 7, 1893. Serial No. 490,253. (No model.)

*To all whom it may concern:*

Be it known that I, CARL A. ANDERSON, a citizen of the United States, residing at Lynn Center, in the county of Henry and State of Illinois, have invented a new and useful End-Gate, of which the following is a specification.

My invention relates to a fastening device for end-gates, and it has for its object to provide a simple, inexpensive and efficient construction whereby the end-gate may be securely locked against vibration and displacement either vertically or laterally; and whereby, when the sides of the vehicle body are spread by the weight of the contents, they may be drawn inward to their proper positions and held in contact with the ends of the end-gate.

Further objects and advantages of this invention will appear in the following description, and the novel features thereof will be particularly pointed out in the appended claims.

In the drawings: Figure 1 is a perspective view of a wagon body provided with end-gate fastening devices embodying my invention. Fig. 2 is a horizontal section of the same, on the line 2—2 of Fig. 1. Fig. 3 is a detail view, in perspective, of the end-gate and attachments. Fig. 4 is a detail view showing the socket-plate which is secured to one side of the wagon body. Fig. 5 is a similar view of the catch-plate which is secured to the opposite side of the wagon body. Fig. 6 is a detail view of the rotary latch.

Similar numerals of reference indicate corresponding parts in all the figures of the drawings.

1 designates a wagon body of any preferred construction, to the inner surface of one side of which is secured a socket-plate 2, which is arranged vertically, extends from the floor of the body to the upper edge of the side thereof, and is flush at its rear edge with said side. This socket-plate is upstruck at its front edge to form a stop 3, and is upstruck at an intermediate point to form a socket 4, which is parallel with the stop flange and opens toward the latter. This socket terminates short of the extremities of the socket-plate, the ends being closed.

Secured to the opposite side of the wagon body is a catch-plate 5, which is disposed as described in connection with the socket-plate with its rear edge flush with the rear edge of the side, and is upstruck at its front edge to form a stop-flange 6. This plate is cut away, approximately at its center, to form an opening 7, at the rear side of which is arranged a forwardly-extending tongue 8, beneath which the material forming the side of the wagon body is cut away to enable an object, as hereinafter described, to be inserted in rear thereof.

9 represents the end-gate, which is provided, at one extremity, with a tongued plate 10, secured to the rear or outer surface thereof and provided at that edge which is flush with the extremity of the end-gate with a rearwardly-extending tongue 11, of equal length with the socket 4 in the socket-plate. When the end-gate is arranged in the wagon body, the tongue 11 fits snugly in the socket 4, with its upper and lower extremities in contact with the upper and lower closed ends of said socket, the rear or exposed surface of the tongued plate 10 bears against the free front edge of the socket, and the front surface of the end-gate is in contact with the stop-flange 3. Attached to the other extremity of the end-gate is a latch-plate 12, provided with a lip 13, which is folded or bent over and secured to the edge of the end-gate, and to this plate is pivotally connected the rotary latch 14, comprising a handle and a semicircular head, the latter being provided at its curved edge with an upstruck rim 15. The rim 15 terminates at one end at the side of the handle, and at the other end extends beyond the pivotal point of the latch and is flared outwardly or from said pivotal point, as shown at 16. When the parts are arranged in their proper relative positions with the tongue, which is carried by one end of the end-gate engaged in the socket, and the other end of said gate in contact with the stop-flange of the catch-plate, the free end of the handle of the latch may be depressed, thereby causing the rim of said latch to engage the tongue 8. The flared portion of the rim enables the side of the wagon body to be drawn inwardly against the extremity of the end-gate.

Secured to the inner or front surface of the end-gate, at the latch-end thereof, is a wear-plate 17, to bear against the stop 6 on the catch-plate; but said plate 17 may be provided at its edge with a tongue 18, similar to the tongue 11, which is arranged at the other end of the end-gate to engage the socket 4; and the catch-plate may be provided with a socket 19, upstruck in the same manner as the socket 4, to form a stop for the catch-end of the end-gate and to receive said tongue 18, as clearly seen in Figs. 2 and 3, in connection with the extension or top box 20, which is connected by the vertical standards 21 with the main portion of the wagon body. In this case the socket 19 will terminate short of the extremities of the plate 5, and will be provided with closed ends to prevent the vertical vibration of the end-gate.

In addition to the above described standards 21, by which the extension or top box is held in place upon the wagon body, I have shown one of my improved latches, as illustrated in Fig. 1, to prevent vertical displacement. This latch, which is indicated at 22, is constructed and operated as above described, in connection with a catch-plate 23, having a tongue 24 with which the rim of the latch engages. Said latch is arranged upon a wear-plate 25, which is extended below the lower edge of the extension or top box to form a guard 26, to prevent contact of the latch with the side of the wagon body.

From the above description it will be obvious that, with the parts constructed in accordance with my invention, the end-gate is held from vibration either vertically or laterally, and the jarring of the wagon cannot cause the disengagement of the latch from the catch-plate for the reason that said latch is engaged with the tongue on the catch-plate by depressing the handle of the latch.

Various changes in the form, proportion, and the minor details of construction may be resorted to without departing from the principle or sacrificing any of the advantages of this invention.

Having described the invention, what is claimed as new is—

1. In a fastening device for end-gates, the combination of a socket-plate secured to the side of the wagon body and provided with a socket and stop-flange, a tongued plate secured to the contiguous end of the end-gate to engage said socket, a catch-plate secured to the opposite side of the wagon body and provided with a forwardly-extending tongue 8, and a rotary latch pivoted to the end-gate and provided with a segmental upstruck rim which is flared or curved outwardly at its free extremity to engage the tongue 8, substantially as specified.

2. The combination with a catch-plate having a raised tongue, of a rotary latch having a segmental head provided at its curved edge with an upstruck rim, which is concentric with the center of movement of the latch and is flared outwardly at its free end, substantially as specified.

3. In a fastening device for end-gates, the combination of a socket-plate, a tongued plate engaging said socket-plate and carried by one end of the end-gate, a catch-plate provided with a tongue 8 and having a contiguous socket, a tongued plate carried by the other end of said end-gate to engage the socket in the catch-plate, and a latch provided with a segmental rim to engage the tongue 8, said sockets terminating short of the extremities of the plates in which they are formed and having closed extremities to prevent vertical displacement of the tongues carried by the tongued plates on the end-gate, substantially as specified.

In testimony that I claim the foregoing as my own I have hereto affixed my signature in the presence of two witnesses.

CARL A. ANDERSON.

Witnesses:
FRANK L. BRODD,
A. L. HULTGREN.